SINGLE-TUNED REGENERATIVE FREQUENCY DIVIDER

Filed April 18, 1956 3 Sheets-Sheet 1

INVENTOR.
EDWIN M. STRYKER, JR.
BY Moody and Goldman
ATTORNEYS

Feb. 23, 1960 E. M. STRYKER, JR 2,926,244
SINGLE-TUNED REGENERATIVE FREQUENCY DIVIDER
Filed April 18, 1956 3 Sheets-Sheet 2
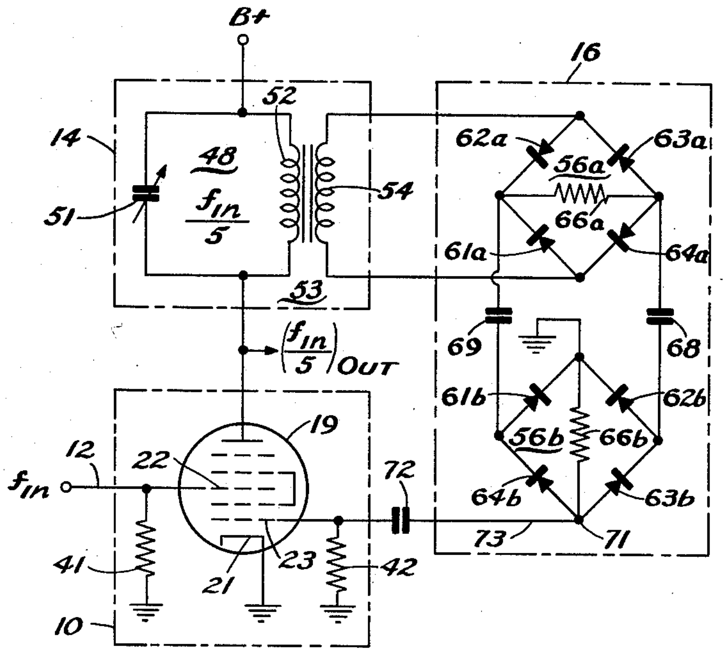
FIG 3
FIG 4(A)
FIG 4(B)
FIG 4(C)
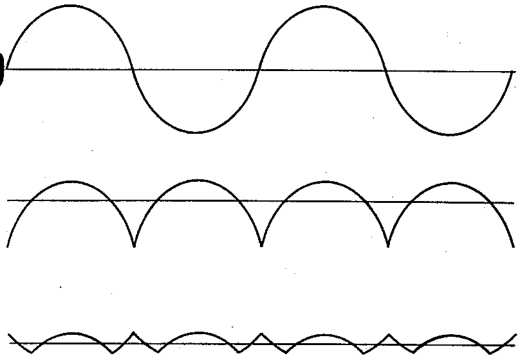
FIG 4
INVENTOR.
EDWIN M. STRYKER, JR.
BY Moody and Goldman
ATTORNEYS Feb. 23, 1960 E. M. STRYKER, JR 2,926,244

SINGLE-TUNED REGENERATIVE FREQUENCY DIVIDER

Filed April 18, 1956 3 Sheets-Sheet 3

INVENTOR.
EDWIN M. STRYKER, JR.
BY Moody and Goldman
ATTORNEYS

United States Patent Office 2,926,244

Patented Feb. 23, 1960

2,926,244

SINGLE-TUNED REGENERATIVE FREQUENCY DIVIDER

Edwin M. Stryker, Jr., Marion, Iowa, assignor to Collins Radio Company, Cedar Rapids, Iowa, a corporation of Iowa Application April 18, 1956, Serial No. 578,976

9 Claims. (Cl. 250—27)

This invention relates generally to regenerative type frequency dividers, and relates particularly to a regenerative divider which has only one tunable circuit.

The conventional type of regenerative frequency divider requires two or more tuned circuits. It has one circuit tuned to a desired submultiple N of an input frequency, and a second circuit tuned to $N-1$ times the submultiple frequency. This invention eliminates the second of these tuned circuits.

When the invention is used as a fixed-tuned frequency divider, its single-tuned circuit permits more easy alignment than the conventional regenerative divider having two tuned circuits.

Furthermore, the invention avoids the phase instability which occurs in the output of conventional regenerative frequency dividers which have two tuned circuits, because of difficulties in maintaining phase alignment between the two tuned circuits, which are connected in tandem in the regenerative loop of the divider.

In such conventional divider, a phase-shift of the output frequency often occurs with temperature variation of both of its tuned circuits. It is, therefore, an object of this invention to provide a frequency divider, which obtains a divided output frequency that is more stable phase-wise than previous types of regenerative dividers.

It is another object of this invention to provide a frequency divider which can provide a substantially pure sine-wave output. It is still another object of this invention to provide a frequency divider which is more easily aligned than previously known regenerative frequency dividers, and which does not have a tracking problem when it is made tunable.

It is a further object of this invention to provide a frequency divider that will cease oscillation immediately after removal of the input frequency being divided.

The conventional regenerative frequency divider requires tracking between its two or more tuned circuits; and tracking problems, in practice, limit the tunable frequency range below what can be obtained with a single tuned circuit.

The invention utilizes a rectifier-multiplying circuit, which has no tuned elements. It is chosen to provide a fundamental frequency component that is $(N-1)$ times its input frequency. In order to obtain the proper multiplication factor, the rectifier-multiplier circuit may also include a phase converter before rectification. The phase converter may for example convert a single-phase wave to plural phase waves. One or more rectifier-multiplier circuits may be connected in tandem to obtain a required multiplication.

The only tuned circuit of the invention is connected in the plate circuit of a non-linear amplifier, which preferably has a square-law characteristic for heterodyning.

The tuned circuit is tuned to the desired submultiple frequency $f_{in}/N$. The rectifier-multiplier circuit receives the output of the tuned circuit and has a fundamental output frequency component that is $(N-1)$ times its submultiple input frequency. The output of the rectifier-multiplier is fed back as another input to the non-linear amplifier and is heterodyned with the incoming frequency to provide an output frequency component of $f_{in}/N$, which is selected by the tuned circuit. The choice of rectifier-multiplier circuit will obtain a particular frequency division.

The divided output frequency of the invention may be stated by the formula:

$$f_{out}=\frac{f_{in}}{N}=\frac{f_{in}}{(S)(T)\ldots(V)+1} \qquad (1)$$

where $f_{in}$ is the input frequency which is to be divided; $f_{out}$ is the divided output frequency, N is the submultiple; S, T . . . V represent the multiplication factors of respective tandem connected rectifier-multipliers, where the multiplication factor pertains only to the selected frequency components of the rectifiers.

When, S, T . . . V are the same type of rectifier-multiplier circuit, the input-output frequency relations of the invention can then be expressed as:

$$f_{out}=\frac{f_{in}}{N}=\frac{f_{in}}{W^r+1} \qquad (2)$$

where W is the multiplication factor of the selected frequency component of the chosen type of rectifier-multiplier circuit, and $r$ is the number of such rectifier-multiplier circuits connected in tandem.

Thus, when the rectifier-multiplier circuit is a full-wave rectifier, its fundamental output component is twice the frequency of its input. When only such circuits are used, the input-output relation in the invention is:

$$f_{out}=\frac{f_{in}}{N}=\frac{f_{in}}{2^r+1} \qquad (3)$$

And, when the rectifier-multiplier circuit provides a conversion from a single-phase wave to three-phase waves followed by half-wave rectification, the fundamental frequency component is three; and the frequency relations of the invention are as follows:

$$f_{out}=\frac{f_{in}}{N}=\frac{f_{in}}{3^r+1} \qquad (4)$$

The non-linear amplifier must have sufficient gain to overcome losses in the rectifier-multiplier circuits. Otherwise, an additional resistive (non-tuned) amplifier stage will be needed in the feedback loop.

Blocking means, such as capacitors or transformers, may be provided at the output of any multiplier-rectifier circuit to remove any D.C. component occurring from the rectification process. Accordingly, only the ripple or alternating-current component of the rectifier output is required in the invention.

Further objects, features and advantages of this invention will be apparent to a person skilled in the art upon further study of the specification and drawings; in which, Figure 1 represents a generic form of the invention;

Figure 3 is a second illustrative form of the invention;

Figure 5:
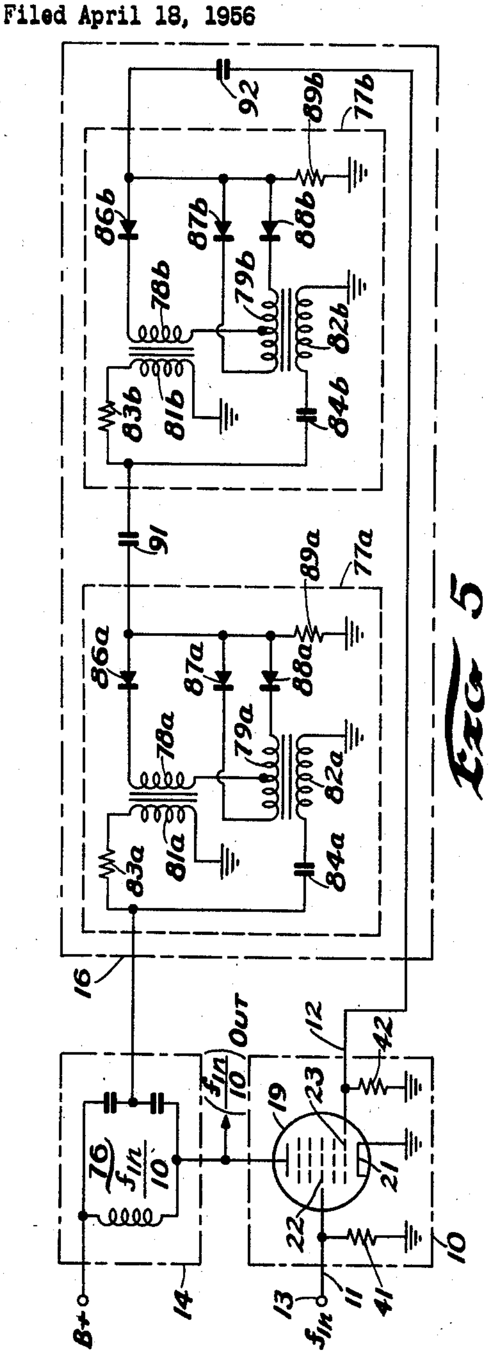
Figures 6, 6A, 6B, 6C:
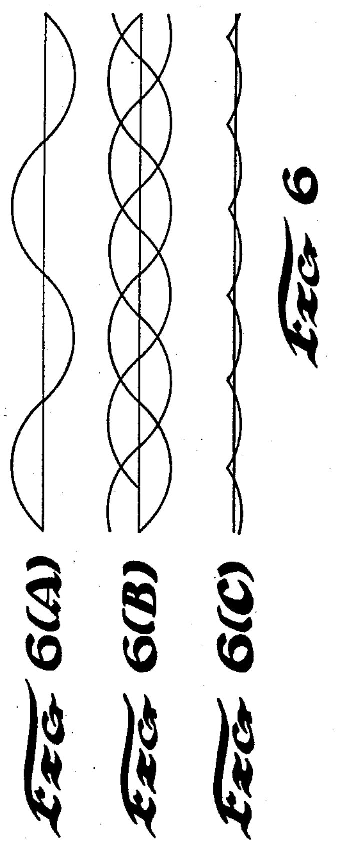

Figures 4(A), 4(B), and 4(C) show waveforms used in explaining the operation of the invention;

Figure 5 provides a third illustrative form of the invention; and,

Figures 6(A), 6(B) and 6(C) show other waveforms used in explaining the operation of the invention.

Figure 1:
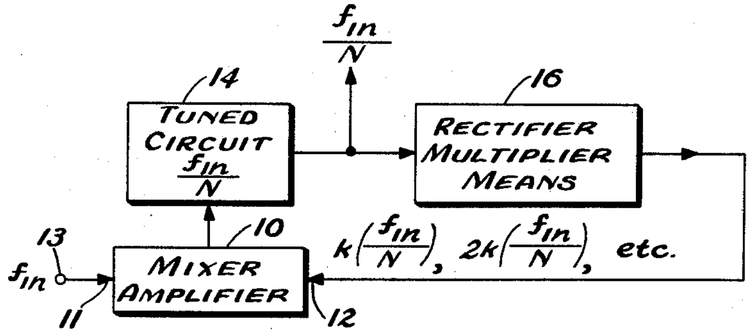

Now referring to the invention in more detail, Figure 1 illustrates a generic form of the invention, wherein mixer-amplifier 10 has a pair of different frequency inputs 11 and 12. Mixer 10 may be a pentagrid converter, or any non-linear amplifier capable of mixing two input frequencies. The incoming frequency, $f_{in}$, which is to be divided, is provided at terminal 13.

A tuned circuit 14 is the only tuned circuit used by the invention and is connected to the mixed output of mixer-amplifier 10. Circuit 14 is tuned to frequency $f_{in}/N$, which is the required divided output frequency. The tuning need not be exact in most cases.

A rectifier-multiplier means 16 is provided which has its input connected to tuned circuit 14. Its input connection to circuit 14 may be done in many different ways depending primarily upon the input impedance to rectifier-multiplier means 16. Therefore, this connection in Figure 1 is merely illustrative and may be modified in an optimum manner by a man skilled in the art.

Rectifier-multiplier means 16 provides a series of harmonics, which are $$k\left(\frac{f_{in}}{N}\right),\ 2k\left(\frac{f_{in}}{N}\right),\ 3k\left(\frac{f_{in}}{N}\right),\ \text{etc.}$$

in which $k$ is equal to $(N-1)$, and N is the required submultiple. The harmonic that is utilized by the invention will generally be the lowest order harmonic, $$k\left(\frac{f_{in}}{N}\right)$$

because it usually has the maximum amplitude.

Rectifier-multipler means 16 may be comprised of one or more individual rectifier circuits connected in tandem; and rectifier circuit may have a set of asymmetric conductors. In any rectifier-multiplier circuit, the asymmetric conductors may be proceeded with phase-multiplying means, if necessary to obtain a proper multiplication factor. Each such individual rectifier-multiplier circuit provides as its selected output frequency component, a frequency that is harmonically related to its input frequency. The selected output harmonic will be $(N-1)$ times frequency output of tuned circuit 14.

The output of rectifier-multiplier means 16 provides the other input 12 to mixer-amplifier 10. The selected harmonic frequency component heterodynes with the incoming frequency $f_{in}$ mixer-amplifier 10; and $f_{in}/N$ is a first order heterodyned component and is the difference frequency between input frequency $f_{in}$ and the selected harmonic. Heterodyned frequency $f_{in}/N$ is selected by tuned circuit 14 to provide the output of the invention.

Mixer-amplifier 10 must also be capable of providing sufficient gain to overcome losses occurring in rectifier-multiplier means 16. Thus, a three element tube, either an electron discharge type or a transistor, may be used. Pentagrid converters are suitable because they are generally designed to have a square-law characteristic, which is required for proper heterodyning, combined with substantial amplification.

Figure 2:
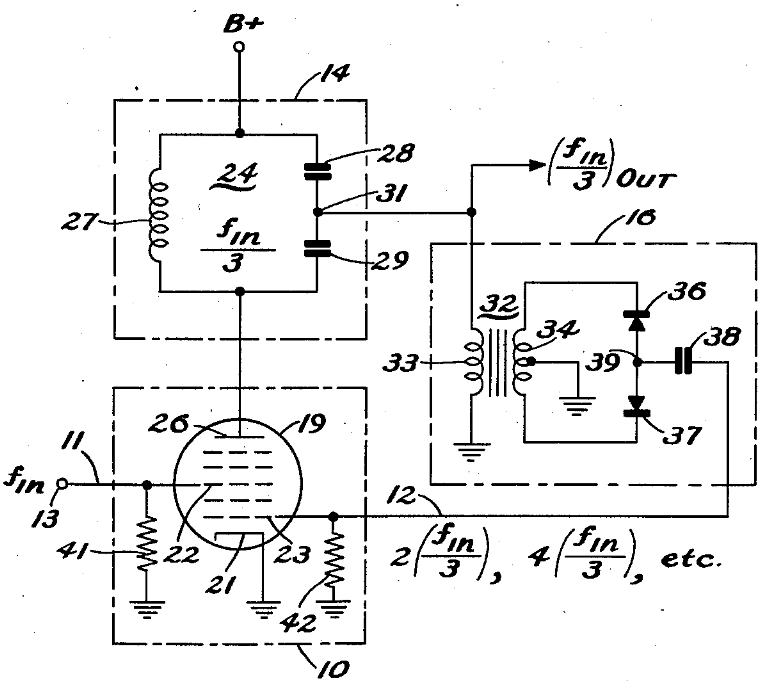
Figure 2 is a first illustrative form of the invention.

Figure 2 provides a mixer-amplifier 10, which includes a pentagrid tube 19 with a cathode 21 connected to ground, and grids 22 and 23 that provide inputs 11 and 12, respectively. An input signal of frequency $f_{in}$ is provided at terminal 13 to input grid 22. Tuned circuit 14 is comprised of a parallel-resonant circuit 24 connected between the plate 26 of tube 19 and a B-plus supply voltage. Resonant circuit 24 is comprised of an inductance 27 and a pair of serially-connected capacitors 28 and 29. Circuit 24 is tuned to a frequency $f_{in}/3$, where 3 is a desired submultiple of the input frequency $f_{in}$. The output of tank circuit 24 is taken from a point 31 intermediate capacitors 28 and 29.

A transformer 32 has its primary 33 connected between intermediate point 31 and ground. Thus, the capacitors 28 and 29 are proportioned to provide a desired impedance match between the resonant circuit and transformer 32. Instead, transformer 32 might be connected to a tap on inductance 27 or might be connected directly to the plate of tube 19, according to the turns ratio of transformer 32.

The secondary 34 of transformer 32 has a center tap connected to ground. A pair of diodes 36 and 37 are connected in full-wave rectifier fashion to secondary 34.

Thus, diodes 36 and 37 are oppositely connected with respect to each other across secondary 34.

A blocking capacitor 38 is connected on one side to point 39 which is between diodes 36 and 37. A pair of grid-leak resistors 41 and 42 are connected between ground and grids 22 and 23, respectively.

The full-wave rectification obtained with diodes 36 and 37 provides a ripple containing the desired frequency component. The D.C. component of rectification is not needed, and may undesirably bias diodes 36 and 37. Thus, capacitor 38 is provided to block the D.C. component of the rectified currents.

Also, capacitor 38 must be sufficiently large that the fundamental frequency of the rectified wave is not unduly attenuated by the high-pass filter arrangement provided by capacitor 38 and grid-leak resistor 42. They could be replaced with a transformer that would not have a high pass characteristic. Such a transformer would have its primary connected between point 39 and ground, and its secondary would be connected between ground and input grid 23.

In operation, an initial transient in the system will initiate a since-wave oscillation in tuned circuit 24 at its frequency $f_{in}/3$. This wave is shown in Figure 4(A) and provides the input to the rectifier. The fully rectified wave shown in Figure 4(B) is the output of the rectifier. After removal of its direct-current component, the wave appearing across resistor 42 is an unsymmetrical alternating-current wave, which has as a fundamental component frequency $2(f_{in}/3)$. The rectified wave will also contain other harmonic components, such as $4(f_{in}/3)$, $6(f_{in}/3)$, etc. However, its fundamental component, $2(f_{in}/3)$, will be substantially greater in amplitude than the other components. The fundamental component is 4.3 times greater in amplitude than the second harmonic and 11.6 times greater than the third harmonic.

The fundamental component $2(f_{in}/3)$ mixes in tube 19 with input frequency $f_{in}$ to heterodyne with a first-order difference frequency $f_{in}/3$, that is selected by tuned circuit 14, which greatly attenuates the other heterodyned products. The other harmonics of rectification, such as $4(f_{in}/3)$ mix to provide a frequency $2(f_{in}/3)$ which is well outside of the bandpass $f_{in}/3$ of tuned circuit 24, and accordingly is rejected by it. Thus, only the desired frequency component from rectifier circuit 16 is selected to provide the required output frequency of the invention.

Another form of the invention is shown in Figure 3. Two full-wave rectification circuits **56*a* and 56*b* are cascaded in Figure 3 to provide an output frequency of $f_{in}/5$ according to Formula 1. Figure 3 also is illustrated with the single amplifier tube 19 containing the two input grids 22 and 23, with grid 22** receiving the input frequency $f_{in}$.

A parallel-resonant circuit 48 is connected between the plate of tube 19 and the B-plus source. Resonant circuit 48 includes a variable capacitor 51 and the inductance appearing at the primary 52 of a transformer 53.

A rectifier-multiplier circuit 16 has its input connected across the secondary 54 of transformer 53. It contains two full-wave rectifier circuits **56*a* and 56*b* connected in tandem with each having four diodes 61, 62, 63 and 64**, designated as *a* or *b* respectively, connected as shown in Figure 3. A resistor 66 has one end connected between diodes 61 and 62 and has its other end connected between the other diodes 63 and 64. The output wave of each rectifier circuit 56 is provided across its resistor 66.

Second full-wave rectifier circuit **56*b* is shown identical to first rectifier 56*a*, although it may be constructed as the rectifier in Figure 1. Rectifier circuit 56*b* has its input connected to the output of first rectifier 56*a* through a pair of blocking capacitors 68 and 69**, which pass the A.C. components of the rectified wave but block its D.C. component.

Output resistor **66*b* of the second rectifier 56*b* is connected between ground and point 71. Another blocking capacitor 72 is connected between rectifier output point 71 and grid 23 by a lead 73**.

The circuit of Figure 3 operates similarly to the circuit of Figure 2. However, it gives a different frequency division, as indicated by Formula 3 above, because of the use of two full-wave rectifier circuits rather than one. The output frequency in Figure 3 is accordingly the fifth submultiple of the input frequency.

Tank circuit 48 is therefore tuned to the fifth submultiple of frequency $f_{in}$; and an oscillation at this submultiple $f_{in}/5$ is started by an initial transient across tank circuit 48, such as by switching on the B-plus voltage or switching on the input frequency $f_{in}$.

The submultiple output wave $f_{in}/5$ is received by secondary 54 as a sine wave of the type shown in Figure 4(A). The output of first full-wave rectifier **56*a* is illustrated in Figure 4(B) after it is stripped of its D.C. component by capacitors 68 and 69**. It is necessary to remove the D.C. component in order to prevent it from undesirably biasing the diodes in the both rectifier circuits.

The fundamental frequency of the rectified output from first rectifier **56*a* will be $2(f_{in}/5)$. Second full wave rectifier 56*b* will rectify the alternating-current ripple provided from first rectifier-multiplier circuit 56*a*. Its alternating output is illustrated by Figure 4(C), which provides a fundamental output frequency component $4(f_{in}/5)$. Frequency component $4(f_{in}/5)$ along with higher order components are fed back to grid 23 of tube 19 where it heterodynes with incoming frequency $f_{in}$ to provide a frequency, $f_{in}/5$, which is the difference between the incoming frequency $f_{in}$ and the fundamental feedback frequency $4(f_{in}/5)$. The difference frequency $f_{in}$ is selected by tank circuit 48**, which is tuned to frequency $f_{in}/5$, to provide the desired divided output frequency in Figure 3.

A binary sequence occurs by the tandem connection of full-wave rectifiers. For example, one rectifier circuit provides a multiplication of two; two rectifier circuits provides a multiplication of four; three rectifier circuits provide a multiplication of eight, four rectifier circuits provide a multiplication of sixteen; etc., to respectively provide the frequency submultiples 3, 5, 9, 17, etc. according to Formula 3 given above.

Figure 5 illustrates a decade frequency divider which has only a one tuned circuit 76. It similarly uses the regenerative principle and utilizes the harmonic relations explained in connection with Figure 1.

Figure 5 utilizes two stages of rectifier-multiplier circuits **77*a* and 77*b*, each providing a 3 to 1 multiplication between its respective input frequency and the fundamental component in its respective output frequency. This is accomplished by providing a broad-band single-to-three phase converter with half-wave rectification of its output. Thus, circuits 77*a* and 77*b*** are identical and have the same reference numerals with different letter characters to distinguish them. The single-to-three phase converters in Figure 5 are known, and are not novel per se.

Each converter has a double transformer arrangement including two primaries and two secondaries. One end of one secondary 78 is connected to the center tap of another secondary 79. First secondary 78 has induced across it a voltage which is 0.886 times the voltage induced across the other secondary 79.

Secondary 78 has a primary 81, and the other secondary 79 has another primary 82. First primary 81 is connected serially to the output of tank circuit 76 through a resistor 83 which has a large value compared to the inductive reactance of primary 81, over the range of required operating frequencies for the divider. The other primary 82 is connected to the output of tank circuit 76 through a phase-shifting capacitor 84, which has a capacitive reactance that is large compared to the inductive reactance of primary 82 over the range of required operating frequencies. Thus, the voltage induced in first primary 81 is substantially in phase with the output of tank circuit 76; while the induced voltage in the other primary 82 is maintained at 90 degree phase with respect to the voltage of tank circuit 76. As a result, the alternating voltage input shown in Figure 6(A) is converted to the three phase waves in Figure 6(B) which are 120 degrees in phase with respect to each other.

The three-phase output is half-wave rectified by the diodes 86, 87 and 88, which are connected serially in a given order to a common resistor 89 that has one end connected to ground. Hence, the half-wave rectified three-phase voltages are simultaneously superimposed across resistor 89 and appear as the wave shown in Figure 6(C), which has a fundamental frequency component that will have three times the frequency provided to the input of the respective multiplier-rectifier circuit 77.

A blocking capacitor 91 connects the output of first rectifier-multiplier circuit **77*a* to second rectifier-multiplier circuit 77*b*. Capacitor 91 removes the D.C. component and permits substantially unrestricted passage of the A.C. components. However, capacitor 91 may be deleted if primary 81*b*** of the second rectifier-multiplier circuit is not adversely affected by the D.C. component.

A second blocking capacitor 92 removes the D.C. component of rectification from the output of second rectifier circuit **77*b* and passes the A.C. components to grid 23 of mixer tube 19. Also, if the D.C. component does not adversely affect the operation of tube 19, capacitor 92** may be deleted.

Since second rectifier-multiplier circuit **77*b* also provides a 3 to 1 multiplication for its fundamental output frequency component in regard to the fundamental frequency component provided from prior stage 77*a*, the fundamental output frequency of second circuit 77*b* will be nine times the output frequency of tank circuit 76 and will be 9/10 of frequency $f_{in}$. This 9/10 frequency component will have substantially greater amplitude than any of the other frequency components fed back to grid 23 and will heterodyne with frequency $f_{in}$ to provide a first order difference frequency $f_{in}/10$, which is the desired output frequency selected by tuned circuit 76**.

It is, therefore, apparent that this invention provides a regenerative frequency divider, which has only one tuned element, and therefore, avoids difficulties occurring in prior regenerative dividers, which have multiple tuned elements. Thus, the invention avoids tracking difficulties. For example, a conventional regenerative decade circuit would require one circuit tuned to $9f_{in}/10$ to track with another circuit tuned to $f_{in}/10$, which is extremely difficult, if not impossible, to do over as large a frequency range as can be accomplished with a single circuit tuned to frequency $f_{in}/10$. Also, the invention permits a decrease in the amount of space required by frequency division equipment, due to elimination of a second tuned circuit.

Furthermore, when the tank circuit is fixed in frequency, a relatively wide variation in input frequency is permissible, with the exact frequency division being provided at the output. The permissible variation of input frequencies, when the tuned circuit is fixed, is governed by the gain of the mixer tube and the Q of the tank circuit. Thus, the greater the gain and the lower the Q, the greater will be the permissible variation of input frequency, although spurious harmonics may increase when the Q is decreased.

While particular forms of the invention have been shown and described, it is to be understood that the invention is capable of many modifications. Changes, therefore, in construction and arrangement may be made without departing from the scope of the invention as given by the appended claims.

What I claim is:

1. Means for regeneratively dividing an input frequency $f_{in}$ by a submultiple N comprising mixer means for heterodyning a pair of inputs having a harmonic relationship, with said input frequency $f_{in}$ being connected as one of said mixer means inputs, means for selecting the submultiple frequency $f_{in}/N$ connected to the output of said mixer means, rectifier-multiplier means having its input connected to the output of said frequency-selecting means to receive said submultiple frequency $f_{in}/N$, said rectifier-multiplier means including phase-conversion means, and also including rectification means connected to the output of said phase-conversion means to generate a plurality of harmonics of the submultiple frequency, one of said harmonics having a frequency $(N-1)f_{in}/N$, and means for connecting the output of said rectifier-multiplier means to the other input of said mixer means.

2. Means for regeneratively dividing an input frequency $f_{in}$ by a given submultiple N comprising mixer means for heterodyning a pair of inputs, with said frequency $f_{in}$ being provided as one of said inputs, tuned-circuit means for selectively passing the submutiple frequency $f_{in}$/N, said tuned-circuit means being connected to the output of said mixer means, multiplier-rectifier means comprising a plurality of multiplier-rectifier circuits connected in tandem, with the first of said multiplier-rectifier circuits connected to the output of said tuned-circuit means, and the output of the last of said multiplier-rectifier circuits connected to the other input of said mixer means, each of said multiplier-rectifier circuits providing a plurality of output harmonics, with its fundamental output harmonic being a multiple of its input frequency to provide a frequency multiplication factor for each of said circuits, said submultiple N being equal to the product of the respective multiplication factors of said plurality of rectifier means plus one .

3. Means for regeneratively dividing an input frequency $f_{in}$ by a submultiple N comprising mixing means for heterodyning a pair of inputs with one of said inputs being the input frequency $f_{in}$, a tuned circuit connected to the output of said mixing means, a plurality of rectifier-multiplier circuits connected in tandem, with the first of said circuits connected to the output of said tuned circuit, and the output of the last of said rectifier-multiplier circuits connected as the other input of said mixing means, said rectifier-multiplier circuits having respective multiplication factors (S). . .(V), each of said multiplication factors being the frequency ratio of the fundamental harmonic of the output of the given rectifier-multiplier circuit divided by its lowest frequency input, said submultiple N being the product of said respective multiplication factors (S). . .(V) plus one.

4. Regenerative means for dividing an input frequency $f_{in}$ by one of its submultiples N comprising means for mixing a pair of inputs, with $f_{in}$ provided as one of said inputs, a tuned circuit connected to the output of said mixing means and tuned to the submultiple frequency $f_{in}/N$, $r$ number of full-wave rectifier circuits connected in tandem between the output of said tuned circuit and the other input of said mixing means, whereby said submultiple N is equal to $(2^r+1)$.

5. Regenrative means for dividing an input frequency $f_{in}$ by a submultiple N comprising means for heterodyning a pair of inputs, with $f_{in}$ being provided as one of said inputs, a tuned circuit connected to the output of said heterodyinng means and tuned to the submultiple frequency $f_{in}/N$, $r$ number of full-wave rectifier means connected in tandem between the output of said tuned circuit and the other input of said heterodyning means, amplification provided in the circuit that includes said heterodyning means, whereby the output frequency is equal to $f_{in}$ divided by $(2^r+1)$.

6. Regenerative means for dividing an input frequency $f_{in}$ by a submultiple N comprising heterodyning means for mixing a pair of inputs, with $f_{in}$ being provided as one of said inputs, a circuit tuned to the submultiple frequency $f_{in}/N$ being connected to the output of said heterodyning means, rectifier-multiplier means having its input connected to the output of said tuned circiut, phase-multiplying means included within said rectifier-multipiler means, with rectification means also included in said rectifier-multiplier means after said phase-multiplying means, the output of said rectifier multiplier means providing a series of harmonics $K(f_{in}/N)$, $2K(f_{in}/N)$, etc., in which K is the multiplication factor of the fundamental output harmonic of the rectifier-multiplier means with respect to submultiple frequency, the multiplication factor K being equal to $(N-1)$, the output of said rectifier-multiplier means being connected to the other input of said heterodyning means.

7. Regenerative means for dividing an input frequency $f_{in}$ by a submultiple N comprising heterodyning means for mixing a pair of inputs, with $f_{in}$ being provided as one of said inputs, a parallel-resonant circuit being connected to the output of said heterodyning means and being tuned to the submultiple frequency $f_{in}/N$, phase-conversion means for converting a single-phase input to three-phase outputs, said phase-conversion means having its input connected in series with the output of said parallel-resonant circuit, asymmetric conduction means connected serially with the respective outputs of said phase-conversion means, resistor means connected serially with said asymmetric conduction means, a fundamental harmonic frequency appearing across said resistor means being three times the lowest frequency component of the single-phase input of said phase-conversion means, and the rectified output of said asymmetric conduction means connected in series with the other input of said heterodyning means.

8. Regenerative-divider means for dividing an input frequency $f_{in}$ by a submultiple N comprising heterodyning means for mixing a pair of inputs of different frequency, with one of said inputs being $f_{in}$, said heterodyning means providing amplification, a tuned circuit being tuned to the submultiple frequency $f_{in}/N$ and being connected to the output of said heterodyning means, rectifier-multiplier means connected serially between the output of said tuned circuit and the other input of said heterodyning means, said multiplier-rectifier means comprising a plurality of multiplier-rectifier circuits; each of said multiplier-rectifier circuits having a plural-phase converter, with asymmetric conduction means connected to the output of said phase converter; said rectifier- multiplier circuits being connected in tandem, with the input of the phase converter of each circuit connected to the rectified output of the prior circuit, except for the first of said rectifier-multiplier circuits which is connected to the output of said tuned circuit, and the rectified output of said last rectifier-multiplier circuit which is connected to said other input of said heterodyning means.

9. Regenerative means for dividing an input frequency $f_{in}$ by a submultiple N comprising heterodyning means for mixing a pair of inputs, with one of said inputs being said input frequency $f_{in}$, a parallel-resonant circuit connected to the output of said heterodyning means, said parallel-resonant circuit being tuned to the submultiple frequency $f_{in}/N$, $r$ number of multiplier-rectifier circuits connected in tandem between the output of said resonant circuit and the other input of said heterodyning means, each of said multiplier-rectifier circuits including a phase-conversion circuit for converting a single-phase input to a three-phase output, each of said multiplier-rectifier circuits also including asymmetric conduction means connected serially with its three-phase outputs, wherein each of said rectification multiplication circuits providing a series of output harmonics with the fundamental harmonic having a three-to-one frequency ratio to the lowest frequency input of the respective multiplier-rectifier circuit, with the output frequency of said divider being equal to the input frequency $f_{in}$ divided by $(3^r+1)$.

References Cited in the file of this patent

UNITED STATES PATENTS

| | | |
|---|---|---|
| 2,159,595 | Miller | May 23, 1939 |
| 2,344,678 | Crosby | Mar. 21, 1944 |
| 2,459,822 | Lalande | Jan. 25, 1949 |
| 2,566,085 | Green | Aug. 28, 1951 |